(12) United States Patent
Somieski et al.

(10) Patent No.: US 12,578,484 B2
(45) Date of Patent: Mar. 17, 2026

(54) HYBRID ODOMETRY

(71) Applicant: u-blox AG, Thalwil (CH)

(72) Inventors: Alexander Somieski, Thalwil (CH);
Yannick Stebler, Thalwil (CH);
Tubanur Ozturk, Tampere (FI)

(73) Assignee: u-blox AG, Thalwil (CH)

( * ) Notice: Subject to any disclaimer, the term of this
patent is extended or adjusted under 35
U.S.C. 154(b) by 276 days.

(21) Appl. No.: 18/392,446

(22) Filed: Dec. 21, 2023

(65) Prior Publication Data

US 2024/0210571 A1     Jun. 27, 2024

(30) Foreign Application Priority Data

Dec. 22, 2022     (EP) ..................................... 22215987

(51) Int. Cl.
G08B 21/00         (2006.01)
G01S 19/39         (2010.01)
G01S 19/49         (2010.01)
G01S 19/52         (2010.01)
(52) U.S. Cl.
CPC ............ G01S 19/52 (2013.01); G01S 19/396
(2019.08); G01S 19/49 (2013.01); *G01S*
*19/393* (2019.08)
(58) Field of Classification Search
CPC ........ G01S 19/52; G01S 19/396; G01S 19/49;
G01S 19/393; G01S 19/38; G01S 19/47;
G01C 21/165; G01C 22/00
USPC ........................................................ 340/988
See application file for complete search history.

(56) References Cited

U.S. PATENT DOCUMENTS

| | | | | |
|---|---|---|---|---|
| 5,906,655 A | * | 5/1999 | Fan ........................ | G05D 1/027 |
| | | | | 701/472 |
| 10,495,763 B2 | * | 12/2019 | Niesen .................... | G01S 19/47 |
| 2007/0250261 A1 | * | 10/2007 | Soehren .............. | G01C 21/188 |
| | | | | 701/510 |
| 2014/0288828 A1 | * | 9/2014 | Werner .................. | G01C 22/00 |
| | | | | 701/527 |
| 2020/0400841 A1 | * | 12/2020 | Culling .................... | G01S 19/14 |
| 2024/0053491 A1 | * | 2/2024 | Kuismanen ............. | G01S 19/07 |

FOREIGN PATENT DOCUMENTS

| | | |
|---|---|---|
| EP | 1005627 | 6/2000 |
| EP | 1847807 | 10/2007 |

OTHER PUBLICATIONS

Extended European Search Report in European Appln. No. 22215987.
3, mailed on Jun. 22, 2023, 9 pages.

* cited by examiner

*Primary Examiner* — Mark S Rushing
(74) *Attorney, Agent, or Firm* — Fish & Richardson P.C.

(57) ABSTRACT

Methods and devices for odometry are disclosed. A previous
position estimate and a current position estimate for a device
are obtained. A current velocity estimate for the device is
also obtained. A first distance estimate is calculated based on
the position estimates, and a second distance estimate is
calculated based on the velocity estimate. These two dis-
tance estimates are combined to generate a combined or
hybrid distance estimate for the distance travelled by the
device.

18 Claims, 3 Drawing Sheets

HYBRID ODOMETRY

FIELD OF THE INVENTION

The present invention relates to odometry. It relates in particular to odometry based on global navigation satellite system (GNSS) signals.

BACKGROUND OF THE INVENTION

Techniques for GNSS positioning are well known in the art. Existing GNSS include the Global Positioning System (GPS), Galileo, GLONASS, and BeiDou Navigation Satellite System (BDS). Each GNSS comprises a constellation of satellites, also known in the art as "space vehicles" (SVs), which orbit the earth. Typically, each SV transmits a number of satellite signals for instance including a Pseudorandom noise (PRN) code at a certain frequency (for instance, 1023 MHz for GPS), and a navigation data message at a lower frequency (for instance, 50 Hz for GPS). These are received by a GNSS receiver for which it is desired to calculate a position fix. The GNSS receiver can generate a number of code phase, carrier phase and/or Doppler measurements using the signals, to derive information about the distance between the receiver and respective satellites (and/or the rate of change of these distances). When a sufficient number of measurements can be made and the navigation data messages are processed or GNSS assistance data is available, the receiver's position can then be calculated.

In some applications, where an inertial measurement unit (IMU) is available, inertial measurements are integrated with the GNSS measurements, to produce an overall navigation solution. This combination of different measurements can be done using a navigation filter—for example, a Kalman filter—which models how each measurement relates to a set of state variables to be estimated (such as position, velocity, and time).

In many applications, it is desirable to be able to produce an estimate of the distance travelled by the device containing the GNSS receiver and IMU. For example, this is of interest to users of sports watches and other portable mobile devices. These users may be travelling by walking, running, swimming, or cycling (by way of example). Other application scenarios involve services provided to road vehicles, where the pricing is based on the mileage driven. Such services can include, but are not limited to: vehicle rental, vehicle insurance, toll roads and congestion/emission charging. Determining the distance travelled in a road vehicle may also be important where regulations require the driver to take a break after driving a certain maximum distance, or where a driver (for example, a taxi driver or delivery driver) is paid per unit distance driven.

Conventionally, the distance travelled has been calculated by comparing successive positions (for example, successive positions output by the navigation filter), determining the incremental position difference between them, and adding up the sum of these incremental position differences to calculate the cumulative distance travelled.

SUMMARY OF THE INVENTION

It would be desirable to improve the accuracy of odometry—that is, the accuracy of the calculation of the cumulative distance travelled by a device.

Methods and devices for odometry are disclosed. A previous position estimate and a current position estimate for a device are obtained. A current velocity estimate for the device is also obtained. A first distance estimate is calculated based on the position estimates, and a second distance estimate is calculated based on the velocity estimate. These two distance estimates are combined to generate a combined or "hybrid" distance estimate for the distance travelled by the device.

According to a first aspect of the present disclosure, there is provided a method for odometry, comprising:

obtaining a previous position estimate for a device;

obtaining a current position estimate for the device;

obtaining a current velocity estimate for the device;

calculating a first distance estimate for a distance travelled by the device, based on the previous position estimate and the current position estimate;

calculating a second distance estimate for the distance travelled by the device, based on the current velocity estimate; and combining the first distance estimate and the second distance estimate, to generate a combined distance estimate for the distance travelled by the device.

The inventors have recognised that, in many cases, purely position-based odometry may tend to overestimate the distance travelled. Without wishing to be bound by theory, it is believed that this is caused by noise in the position estimate continually adding incrementally to the calculation of distance. Meanwhile, purely velocity-based odometry may sometimes underestimate the distance travelled. Without wishing to be bound by theory, it is believed that this happens because velocity estimates (in particular, those produced by a navigation filter) may be constrained to be smooth. Thus, velocity-based estimates of distance travelled may miss sudden, short-lived changes in speed and direction. This leads them to produce a track with the corners smoothed out, which underestimates the distance travelled. The inventors have found that a hybrid solution, combining position-based and velocity-based calculations can offer a good compromise between the two alternatives, in which each source of information complements and mitigates the errors in the other.

The first and second distance estimates are incremental distance estimates based on position and velocity, respectively.

The current position estimate and the current velocity estimate may relate to a current epoch. The previous position estimate may relate to a previous epoch. (The previous epoch may be the epoch immediately preceding the current epoch.)

The method may further comprise outputting the combined distance estimate.

The combining may comprise a weighted sum. In particular, the combining may comprise a weighted linear summation of the first distance estimate and the second distance estimate.

The method may further comprising: obtaining a variance for the previous position estimate; obtaining a variance for the current position estimate; obtaining a variance for the current velocity estimate; calculating a first variance for the first distance estimate, based on the variance for the current position estimate and the variance for the previous position estimate; and calculating a second variance for the second distance estimate, based on the variance for the current velocity estimate, wherein the combining comprises weighting the first distance estimate in inverse relation to the first variance and weighting the second distance estimate in inverse relation to the second variance.

The method may further comprise calculating a variance for the combined distance estimate based on the first variance and the second variance. Calculating the variance for the combined distance estimate may comprise a weighted sum of the first variance and the second variance.

The method may further comprise, for at least one of the first distance estimate and the second distance estimate: calculating a speed from the distance estimate; and comparing the speed with a maximum speed threshold, wherein the combining of the first distance estimate and the second distance estimate is performed responsive at least in part to the speed not exceeding the maximum speed threshold.

This can act as a sanity check on each incremental distance estimate. If one of the distance estimates gives a result that implies a speed of travel greater than the maximum expected speed (for example, in the context of a particular application scenario), then the distance estimates are not combined and used for odometry. Instead, the odometry method may rely on whichever of the two distance estimates passes the sanity check by implying a speed of travel less than or equal to the maximum expected speed (assuming that at least one of the distance estimates implies a reasonable speed of travel).

Calculating the speed may comprise dividing the distance estimate by a time interval that has elapsed since the previous distance estimate was calculated.

The method may further comprise, for at least one of the first distance estimate and the second distance estimate: calculating an acceleration based on the distance estimate; and comparing the acceleration with a maximum acceleration threshold, wherein the combining of the first distance estimate and the second distance estimate is performed responsive at least in part to the acceleration not exceeding the maximum acceleration threshold.

Again, this can act as a sanity check. If the acceleration implied by either distance estimate is too great (that is, larger than the maximum acceleration that can be expected in a particular application scenario), then that distance estimate is probably wrong. When this happens, the distance estimates are not combined. Instead, the odometry method may rely on the other of the two distance estimates (assuming the other distance estimate implies a reasonable acceleration).

Calculating the acceleration based on the distance estimate may comprise calculating a speed from the distance estimate; and calculating the acceleration based on the calculated speed.

Calculating the speed may comprise dividing the distance estimate by a time interval that has elapsed since a previous distance estimate was calculated. Calculating the acceleration may comprise subtracting a previously calculated speed from the (current) calculated speed and dividing the result by the time interval.

Any one or any combination of two or more of the following may be provided by a navigation filter: the previous position estimate; the current position estimate; the current velocity estimate; the variance for the current position estimate; and the variance for the current velocity estimate. The navigation filter may be a Kalman filter, for example. Inputs to the navigation filter (for example, Kalman filter) may include GNSS measurements, and inertial measurements.

The device optionally comprises an inertial measurement unit and any one or any combination of two or more of the following may be based at least in part on inertial measurements provided by the inertial measurement unit: the previous position estimate; the current position estimate; the current velocity estimate; the variance for the current position estimate; and the variance for the current velocity estimate.

Any one or any combination of two or more of the following may be based at least in part on GNSS measurements derived from GNSS signals: the previous position estimate; the current position estimate; the current velocity estimate; the variance for the current position estimate; and the variance for the current velocity estimate.

The estimate (or each estimate) may be produced by the navigation filter based in part on inertial measurements and in part on GNSS measurements.

The method may further comprise calculating a quality factor associated with the GNSS measurements; and comparing the quality factor to a quality threshold, wherein the combining of the first distance estimate and the second distance estimate is performed responsive at least in part to the quality factor exceeding the quality threshold.

If the quality factor were not to exceed the quality threshold, the method may comprise suppressing/aborting generation of the combined distance estimate. When the quality factor does not exceed the quality threshold, the method may comprise waiting until an epoch in which the quality factor exceeds the quality threshold.

The quality factor may be indicative of (for example, may quantify or correlate with) signal distortion of GNSS satellite signals received by a GNSS receiver. The quality factor may be derived from analysis of the received GNSS signals.

In some examples, the quality factor is based at least in part on a number of satellites associated with the GNSS signals. Higher numbers of satellites may be associated with higher values of the quality factor.

Alternatively, or in addition, the quality factor may be based at least in part on a carrier-to-noise ratio, or a carrier-to-noise density ratio associated with the GNSS signals. For instance, the quality factor may be based at least in part on an average (for example, a mean) of said ratios over the set of GNSS signals. Higher ratios may be associated with higher values of the quality factor.

The method may further comprise comparing a magnitude of the current velocity estimate with a minimum speed threshold, wherein the combining of the first distance estimate and the second distance estimate is performed responsive at least in part to the magnitude of the current velocity estimate exceeding the minimum speed threshold.

If the magnitude of the current velocity estimate were not to exceed the minimum speed threshold, the method may comprise suppressing/aborting generation of the combined distance estimate. When the current velocity estimate does not exceed the minimum speed threshold, the method may comprise waiting until an epoch in which the velocity estimate exceeds the minimum speed threshold.

It should be understood that the "magnitude of the current velocity estimate" refers to the speed associated with the current velocity estimate. If the speed of the device is too slow, then velocity estimates may be unreliable. In such circumstances, it may be better not to calculate the combined distance estimate (which is based in part on the current velocity estimate). Instead, it may be better to wait until an epoch in which the speed exceeds the minimum speed threshold. (If the speed is too slow, the device may be assumed to be stationary; therefore, it may be preferable not to use any odometer outputs.)

The method may further comprise obtaining an uncertainty estimate associated with the current position estimate; comparing the uncertainty estimate with an uncertainty threshold, wherein the combining of the first distance estimate and the second distance estimate is performed responsive at least in part to the uncertainty estimate being less than the uncertainty threshold.

If the uncertainty estimate were not to satisfy the uncertainty threshold criterion (that is, if it were greater than or equal to the threshold), the method may comprise suppressing/aborting generation of the combined distance estimate. When the uncertainty estimate does not satisfy the uncertainty threshold, the method may comprise waiting until an epoch in which the uncertainty does satisfy the uncertainty threshold. The uncertainty estimate may comprise an error bound for the position. In particular, the uncertainty estimate may comprise a standard deviation associated with the current position estimate. This may be obtained by calculating the square root of the variance for the position estimate, provided by the navigation filter. The uncertainty threshold may comprise a maximum permitted error. In this case "satisfying" the uncertainty threshold means that the error bound (e.g., standard deviation of position) is less than the maximum permitted error.

In some examples, the combining of the first distance estimate and the second distance estimate may be performed responsive to a combination of criteria being satisfied. For example, combining the first distance estimate and the second distance estimate may be performed responsive to the magnitude of the current velocity estimate exceeding the minimum speed threshold, and the magnitude of the acceleration estimate not exceeding the maximum acceleration threshold, and the quality factor exceeding the quality threshold. If any one of the three criteria is not satisfied, the method may comprise suppressing/aborting generation of the combined distance estimate.

Also provided is a computer program comprising computer program code configured to cause one or more processors to perform all the steps of a method as summarized above when said computer program is run on said one or more processors. The computer program may be stored on a computer-readable storage medium (optionally non-transitory).

Also provided is a device for odometry, comprising:

a memory for storing estimates of a distance travelled by the device; and a processor, configured to:

obtain a previous position estimate for the device;

obtain a current position estimate for the device;

obtain a current velocity estimate for the device;

calculate a first distance estimate for the distance travelled by the device, based on the previous position estimate and the current position estimate;

calculate a second distance estimate for the distance travelled by the device, based on the current velocity estimate; and combine the first distance estimate and the second distance estimate, to generate a combined distance estimate for the distance travelled by the device.

The device may further comprise a GNSS receiver configured to produce GNSS measurements, and an inertial measurement unit configured to produce inertial measurements. The device may comprise a navigation filter configured to produce the position estimates and the velocity estimate.

The processor may be further configured to perform any of the steps of a method as summarised previously above.

BRIEF DESCRIPTION OF THE DRAWINGS

The invention will now be described by way of example with reference to the accompanying drawings, in which.

It should be noted that these figures are diagrammatic and not drawn to scale.

DETAILED DESCRIPTION

Reference will now be made in detail to examples according to the present disclosure, which are illustrated in the accompanying drawings. The described examples should not be construed as being limited to the descriptions given in this section. Other examples may have different forms.

Figure 1:
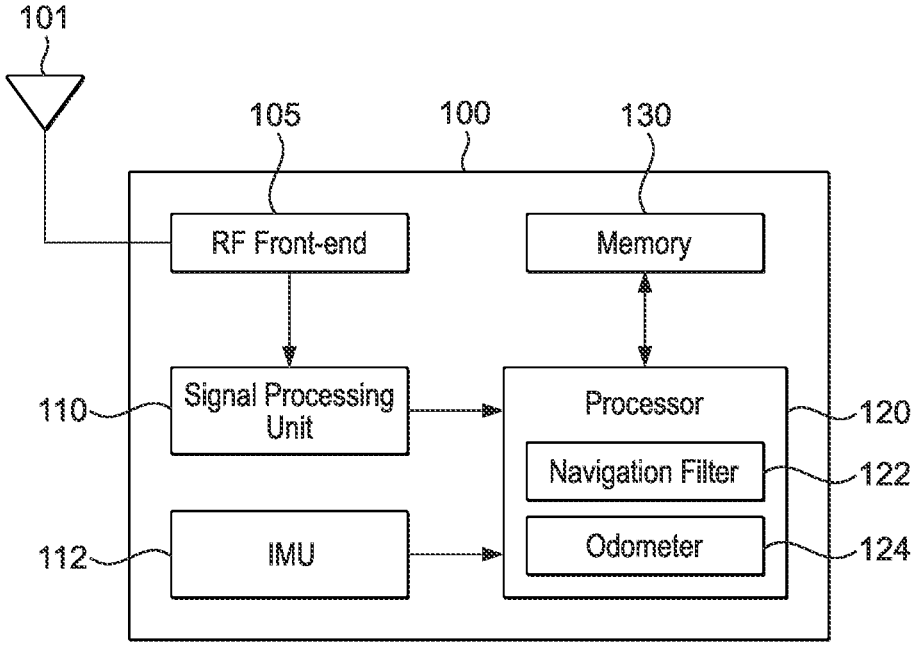
FIG. 1 is a schematic block diagram of a device according to an example.

FIG. 1 is a schematic block diagram of a device according to an example. The device comprises a GNSS antenna 101 and a GNSS receiver module 100. The GNSS antenna 101 is configured to receive GNSS signals. It may be configured to receive GNSS signals from a single GNSS constellation (for example, GPS), or it may be configured to receive GNSS signals from multiple constellations (for example, GPS, Galileo, GLONASS, and/or BeiDou). The GNSS receiver module 100 comprises an RF front-end 105, a signal processing unit 110, a processor 120, and a memory 130. The RF front-end 105 is configured to receive GNSS signals via the GNSS antenna 101, and to output them to the signal processing unit 110. The RF front-end 105 is configured to down-convert and digitise the satellite signals received via the antenna 101. The RF front-end essentially conditions the signals for subsequent signal processing. Other typical tasks performed by the front-end include filtering and amplification. The satellite signals received at the RF front-end 105 via the antenna 101 include at least one ranging signal, such as a GPS L1 C/A signal, for each of a plurality of satellites. The signal processing unit 110 is configured to track the received GNSS signals—for example, in frequency, delay (code-phase) and carrier phase—and to produce GNSS measurements from the received GNSS signals. The processor 120 is configured to process the GNSS measurements obtained from the signal processing unit 110. While it should be understood that more than one processor may be present within the GNSS receiver module 100 for implementing methods according to the present disclosure, for the purposes of the present description it is assumed that there is only one processor 120, as depicted in FIG. 1. The processor implements a navigation filter 122. In the present example, this navigation filter 122 is a Kalman filter; however, this may be substituted with any other suitable navigation filter. At each of a plurality of time increments (epochs), the navigation filter 122 estimates the current value of a state vector of state variables, along with their associated uncertainties. In the context of positioning, the state variables estimated by the navigation filter 122 generally include position and time variables, and optionally velocity and other variables. The memory 130 is in communication with the processor 120. The memory 130 is configured to store software/firmware to be executed by the processor 120. The software/firmware is configured to control the processor 120 to carry out a processing method according to an example. The memory may also be configured to store data that is used as input to the processor 120 and/or to store data that is output by the processor 120.

The GNSS receiver module 100 also includes an inertial measurement unit (IMU) 112. The IMU comprises a plurality of accelerometers configured to provide inertial measurements to the processor 120. The inertial measurements are used in the navigation filter 122 to augment the GNSS measurements provided by the signal processing unit 110. If GNSS signals are temporarily unavailable, the navigation filter can continue to estimate a position and velocity for the device, based on dead reckoning using the inertial measurements.

As well as the navigation filter 122, the processor also implements an odometer 124, which will be described with reference to FIG. 2.

Figure 2:
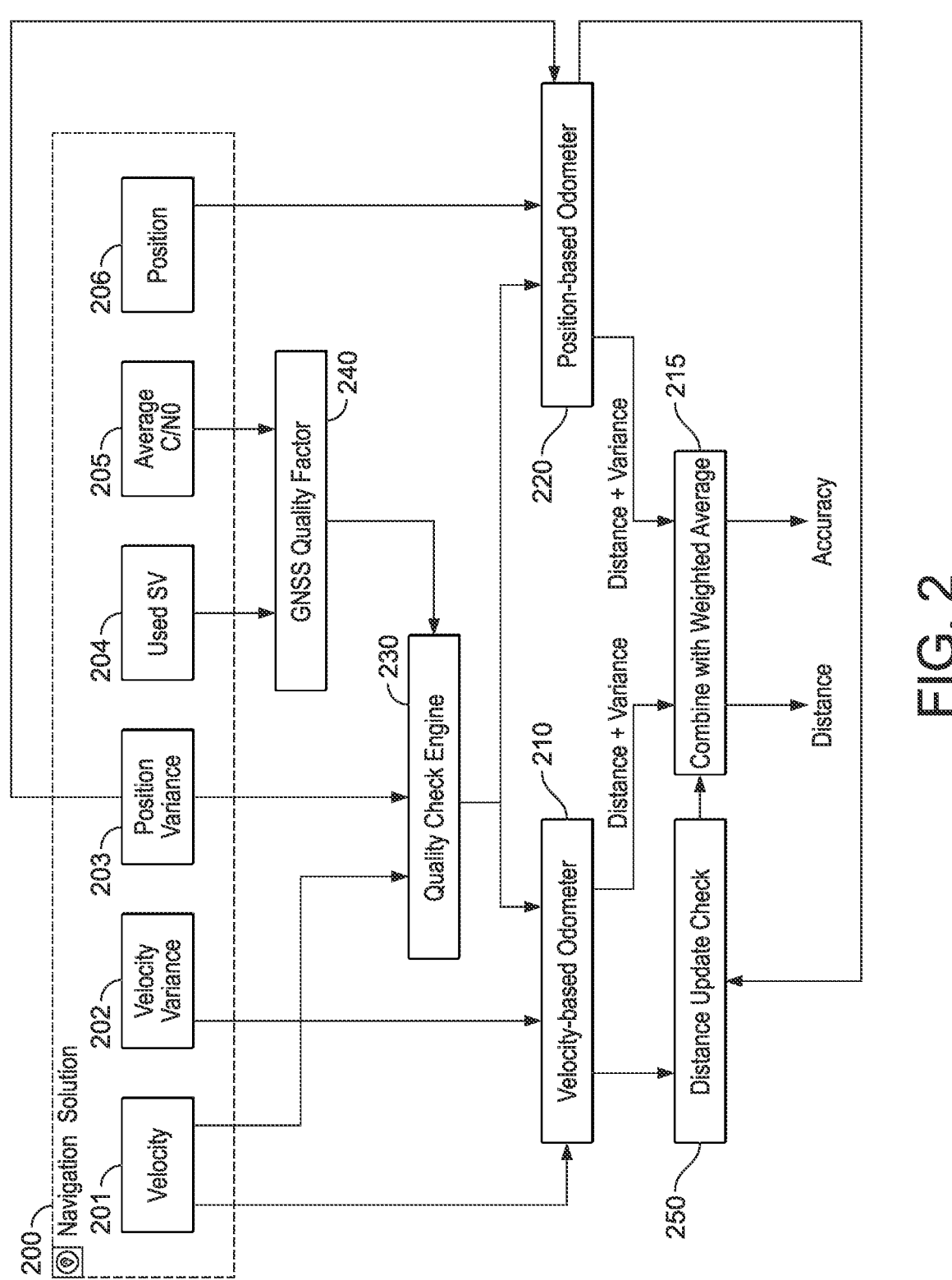
FIG. 2 is a functional block diagram and information flowchart, describing the operation of an odometer according to an example.

FIG. 2 is a functional block diagram describing the odometer 124. The block diagram also doubles as an information flowchart, showing the passing of data from one functional block to another. In the present example, as illustrated in FIG. 1, the odometer 124 is implemented in software running on the processor 120. In this context, the functional blocks in FIG. 2 represent software subroutines. However, in other examples, some or all of the odometer 124 could be implemented in hardware. In such examples, some or all of the functional blocks in FIG. 2 may represent hardware components (or groups of hardware components).

The odometer 124 takes as input the navigation solution 200 produced by the navigation filter 122. In FIG. 2, the blocks other than block 200 represent functional components of the odometer 124. The navigation solution 200 includes: a velocity estimate 201; a velocity variance 202; a position variance 203; an indication 204 of the GNSS space vehicles (SVs) used in calculating the navigation solution; an average carrier to noise density ratio of the GNSS signals used in calculating the navigation solution; and a position estimate 206. Each of these elements of the navigation solution is used in different ways by the odometer 124.

The odometer 124 comprises a velocity-based odometer 210 and a position-based odometer 220. Each of these odometers 210, 220 produces an estimate of the incremental distance travelled since the last update, and a variance associated with that estimate. Each incremental distance estimate independently estimates the distance travelled. The incremental distance estimates from the two odometers 210, 220 are combined in block 215 (subject to various checks being satisfied). The combination performed in block 215 is weighted such that incremental distance estimates associated with large variance have relatively less influence on the resulting combined incremental distance estimate, and incremental distance estimates associated with small variance have relatively greater influence on the resulting combined incremental distance estimate. Overall, the weighting is constructed so that the sum of the effective weights on the two incremental distance estimates is equal to one (neither scaling up nor scaling down the estimate). In this way, system aims to place more weight on whichever incremental distance estimate is considered the more reliable. Weights of (1, 0) or (0, 1) would mean simply choosing one incremental distance estimate or the other. The present solution aims to strike an optimal balance between these two extremes.

A quality check engine 230 performs various quality checks on the navigation solution. If these quality checks fail, the quality check engine suppresses the running of the velocity-based odometer 210 and the position-based odometer 220 for the present epoch. Along with inputs taken directly from the navigation solution 200, the quality check engine 230 also takes as input a GNSS quality factor, calculated in block 240 from the navigation solution.

A distance update check 250 is applied to the incremental distance estimate produced by each of the two odometers 210 and 220. This operates essentially a sanity check. If either odometer 210, 220 produces an unrealistic estimate for the incremental distance, then the distance update check

250 can suppress the combination of the estimates in block 215. This avoids the (likely erroneous) unrealistic estimate corrupting the solution.

The velocity-based odometer 210 takes as inputs the current velocity estimate 201 and velocity variance 202 obtained from the navigation solution 200. It creates an incremental distance estimate by integrating the current velocity estimate 201 over the update interval between epochs. For example, if the navigation solution is updated at a rate of 1 Hz, and the magnitude of the estimated velocity for the current epoch is 3 m/s, the velocity-based odometer 210 will output an incremental distance estimate of 3 m.

The position-based odometer 220 takes as inputs the position 206 and the position variance 203 obtained from the navigation solution 200. It creates an incremental distance estimate by comparing the current position estimate 206 with the position estimate from the previous epoch. The incremental distance estimate is given by the magnitude of the vector difference between these two position estimates.

Each odometer 210, 220 also calculates a variance estimate for the incremental distance estimate that it produces. These variance estimates are derived from the variances obtained from the navigation solution 200. For the velocity-based odometer 210, it is assumed that the velocity error is normally distributed. By propagating the velocity variance through the calculation of the incremental distance estimate, and linearising around the expected value, it can be shown that the variance of the velocity-based incremental distance estimate, for the $k^{th}$ epoch, is approximated by:

$$\mathrm{var}[D_v(t_k)] = \sigma^2_{D_v}(t_k) = \Delta t^2 \frac{1}{4\mu_k} \sum_{i=1}^{3} 2\sigma^2_{i,k}\left(2\mu^2_{i,k} + \sigma^2_{i,k}\right)$$

Here, $\Delta t$ is the update interval between epochs; $\mu_{i,k}$ is one component of the three-dimensional velocity estimate for epoch k; and $\sigma_{i,k}^2$ is the corresponding variance estimate attributed by the navigation filter to that component of the velocity estimate. Meanwhile, $\mu_k$ is the expected value of the square of the 3D speed.

For the position-based odometer 220, it is assumed that the position error is normally distributed. By propagating the position variance through the calculation of the incremental distance estimate, and again linearising around the expected value, it can be shown that the variance of the position-based incremental distance estimate, for the $k^{th}$ epoch, is approximated by:

$$\mathrm{var}[D_p(t_k)] = \sigma^2_{D_p}(t_k) = \frac{1}{4\mu_k} \sum_{i=1}^{3} \mathrm{var}\left[(p_{i,k} - p_{i,k-1})^2\right]$$

Here, $\mu_k$ is the expected value of the square of the position difference in 3D; $p_{i,k}$ is one component of the three-dimensional position estimate for epoch k. Note that both the current position and the previous position $p_{i,k-1}$ are involved in this calculation. The duration of the update interval does not play any role.

The position-based odometer stores the position and variance estimates from the previous epoch. The variance of the square of the position difference is calculated as:

$$\mathrm{var}\left[(p_{i,k} - p_{i,k-1})^2\right] =$$

-continued $$4(\mu_{i,k} - \mu_{i,k-1})^2 (\sigma_{i,k}^2 + \sigma_{i,k-1}^2)^2 + 2\sigma_{i,k}^4 + 2\sigma_{i,k-1}^4 + 4\sigma_{i,k}^2\sigma_{i,k-1}^2$$

Here, $\sigma_{i,k}^2$ is the variance estimate attributed by the navigation filter to the relevant ($i^{th}$) component of the position estimate, for epoch k; $\sigma_{i,k-1}^2$ is the variance estimate for the relevant component of the position estimate, for the preceding epoch k–1.

In the combination block 215, the two incremental distance estimates are combined using a weighted mean. The weights are inversely related to the variances associated with the respective incremental distance estimates. More specifically, the weighted mean is calculated as $$D(t_k) = \frac{\omega_{D_p}(t_k) D_p(t_k) + \omega_{D_v}(t_k) D_v(t_k)}{\omega_{D_p}(t_k) + \omega_{D_v}(t_k)}$$

Here, $D(t_k)$ is the final combined distance increment; $D_p(t_k)$ and $D_v(t_k)$ are the incremental distance estimates produced by the position-based odometer 220 and the velocity-based odometer 210, respectively, at time $t_k$ (that is, epoch k); and $\omega_{D_p}(t_k)$ and $\omega_{D_v}(t_k)$ are the corresponding weights at this time. The form of the denominator provides a normalisation, which ensures that the effective weights applied to the two incremental distances sum to one (1). Each of the incremental distance estimates independently estimates the same quantity; therefore, it would not be correct to simply add these together or to use effective scale factors that sum to more than (or less than) one. The weights in the numerator are inversely proportional to the variances (calculated above):

$$\omega_{D_p}(t_k) = \frac{1}{\sigma_{D_p}^2}$$

$$\omega_{D_v}(t_k) = \frac{1}{\sigma_{D_v}^2}$$

This enables a principled combination of the incremental distance estimates produced by the two odometers 210, 220. The combination block 215 is also configured to produce a variance estimate for the final combined distance increment, based on the calculated variances for the individual incremental distance estimates produced by the odometers 210 and 220:

$$\sigma_D^2(t_k) = w^2 \sigma_{D_p}^2(t_k) + (1-w)^2 \sigma_{D_v}^2(t_k)$$

In this expression, w is the relative weight given to the position-based distance increment:

$$w = \frac{\omega_{D_p}}{\omega_{D_p} + \omega_{D_v}}$$

As mentioned above, various checks are performed, to ensure—as far as possible—that erroneous position and velocity estimates are not used to calculate incremental distances for odometry. These will now be described.

Functional block 240 calculates a GNSS quality factor based on (i) the information 204 about the SVs used to calculate the navigation solution and (ii) the average carrier to noise density ratio ($C/N_0$) 205 of the GNSS signals. If there were no usable satellite signals, then the quality factor is set to zero. Provided there was at least one usable satellite signal, the mean $C/N_0$ 205 across all usable satellite signals is determined. The quality factor is then set based on the following heuristics:

If the number of usable satellites was less than or equal to 5, or the mean $C/N_0$ was less than or equal to 15, then the quality factor is set to 0.7;

Otherwise, if the number of usable satellites was 6, or the mean $C/N_0$ was less than or equal to 20, then the quality factor is set to 0.8;

Otherwise, if the mean $C/N_0$ was less than or equal to 25, then the quality factor is set to 0.9;

Otherwise, the quality factor is set to 1.

Figure 3:
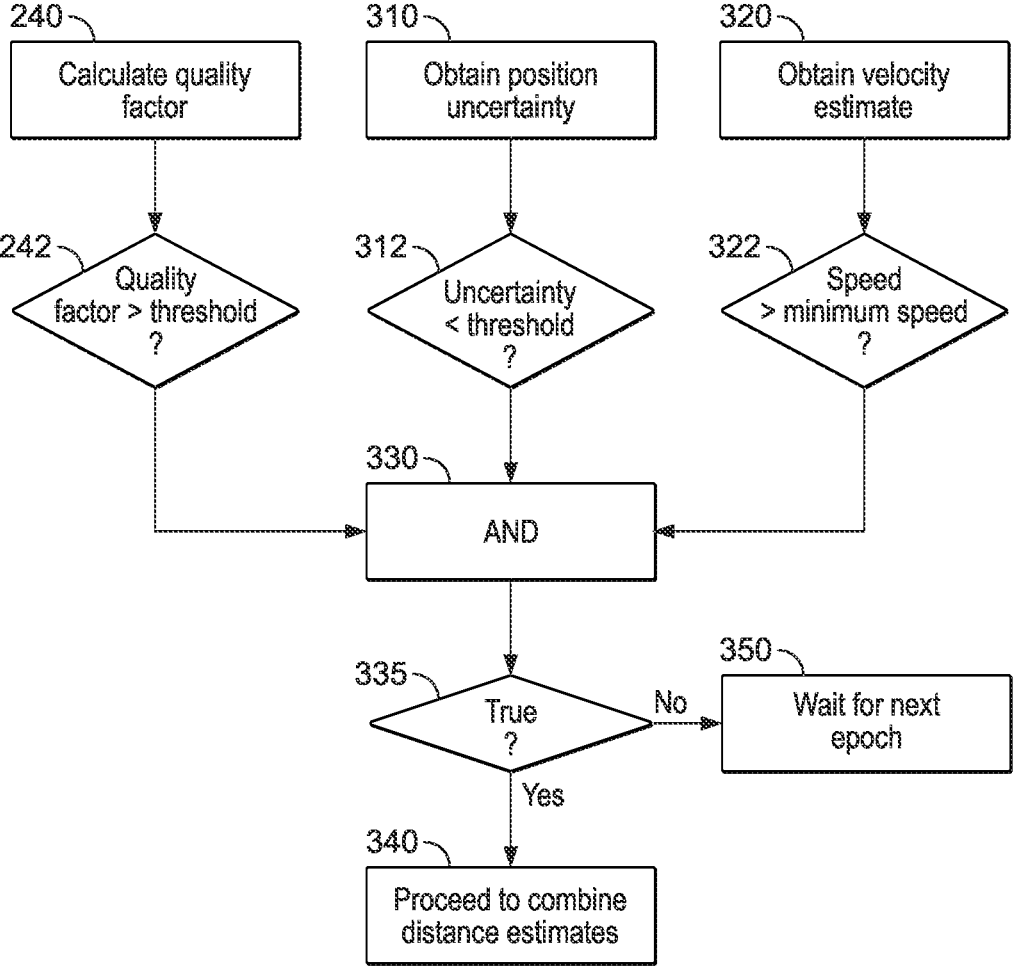
FIG. 3 is a flowchart describing the operation of the quality check engine of FIG. 2, according to an example.

The flowchart of FIG. 3 illustrates one way in which the quality check engine 230 can determine whether to proceed with odometry for the present epoch. The quality check engine 230 takes as inputs:

i. The velocity estimate 201 from the navigation solution;

ii. The position variance 203 from the navigation solution; and iii. The GNSS quality factor, from block 240.

For convenience, the calculation 240 of the GNSS quality factor is shown again in FIG. 3. In step 242, the processor 120 compares the calculated GNSS quality factor with a quality threshold, outputting "true" or "false" depending on whether the quality factor is greater than the threshold or not. In the present example, the quality threshold is set to 0; however, in other examples it could be set to a higher value. This test avoids the use of low quality GNSS measurements influencing the odometry solution. By only allowing the use of high quality GNSS information, the method helps to further increase the accuracy of the odometry solution.

In step 310, the processor obtains a position uncertainty associated with the position estimate 206. According to the present example, the position uncertainty is defined by the standard deviation of the position estimate. This is the square root of the position variance 203 provided by the navigation solution. In step 312, the standard deviation is compared with an uncertainty threshold. If the standard deviation is less than the uncertainty threshold, step 312 outputs a binary "true" value. Otherwise, step 312 outputs a binary value of "false". This test avoids use of uncertain position information in the odometry solution. By only basing the odometry on position information associated with a high level of certainty, the method helps to further increase the accuracy of the odometry solution.

In step 320, the processor 120 obtains the current velocity estimate 201 from the navigation solution. It compares the estimated speed (that is, the magnitude of the velocity estimate 201) with a minimum speed threshold, in step 322. If the estimated speed is greater than the minimum speed threshold, step 322 outputs a binary "true" value. Otherwise, step 322 outputs a binary value of "false". This test is intended to avoid calculating incremental distances when the device is stationary. In such circumstances, accumulating incremental distances into the odometry result would simply accumulate noise.

The outputs of steps 242, 312, and 322 are input to an AND operator 330. If all three inputs are "true", the AND operator 330 also outputs a binary value of "true". Otherwise, it outputs a binary value of "false". In step 335, the processor 120 checks whether the output of the AND operator 330 was "true". If so, then the method proceeds with calculating and combining the two incremental distance estimates (that is, the position-based incremental distance estimate and the velocity-based incremental estimate)—see step 340. If, in step 335, it is determined that the output of the AND operator was "false" then the processor 120 does not proceed to calculate and combine the incremental distance estimates. No distance increment is calculated for the current embodiment. Instead, the processor 120 waits for the next epoch—see step 350. At the next epoch, the processor will repeat the various calculations and tests. Eventually, an epoch will be reached at which all of the tests are satisfied, and the method proceeds to step 340 of FIG. 3.

Note that, according to the present example, if several epochs have elapsed since the last odometry update (for instance, since the last epoch in which the AND operator returned a value of "true"), then the velocity-based incremental distance estimate is not used for odometry. This is because it is considered not to be sufficiently reliable over an interval of several epochs. Instead, for the first epoch at which odometry resumes, only the output of the position-based odometer 220 is used. The combination with the output of the velocity-based odometer 210 can resume again at the second successive epoch at which the odometers 210, 220 calculate updates.

A further set of checks is performed by the distance update check 250. This block takes as inputs the outputs of the two odometers 210 and 220. That is, it receives as input (i) the velocity-based incremental distance estimate for the current epoch and (ii) the position-based incremental distance estimate for the current epoch. From each incremental distance estimate, block 250 calculates a speed value. This is done by dividing the distance estimate by the relevant time interval—that is, the time interval since the last incremental distance estimate. In some cases, this time interval may be the update interval between successive epochs. However, if odometry was suppressed for one or more epochs, the time interval will be longer. From the speed value, in turn, the processor 120 calculates an acceleration value. The acceleration is calculated by comparing the current speed value with the previous speed value obtained in the most recent previous epoch (for which odometry was not suppressed). The acceleration is determined as the difference between the two speed values, divided by the time interval. The processor 120 then compares each value to a threshold. Each of the two speed values—that is, the position-based speed value and the velocity-based speed value—is compared with a maximum speed threshold. The maximum speed threshold is defined in advance to correspond to the dynamics of the relevant target application. For example, the maximum speed threshold for a vehicle-based tracking application would be set higher than the maximum speed threshold for a fitness-tracker.

If the speed value (in either case) is greater than the maximum speed threshold, then the processor 120 determines that the corresponding incremental distance estimate is wrong. Odometry can then be based on the other incremental distance estimate (provided it passed all the relevant tests). Alternatively, odometry can be suppressed for the present epoch, and tried again at a subsequent epoch.

The same approach is taken for the acceleration values. Each of the two acceleration values—that is, the position-based acceleration value and the velocity-based acceleration value—is compared with a maximum acceleration threshold. Again, the maximum acceleration threshold is based on the expected dynamics for the target application. For instance, for a vehicle tracking application, a maximum acceleration threshold of 10 to 15 $m/s^2$ may be appropriate. For a fitness-tracker used for walking, jogging, and running, a maximum acceleration threshold of 5 $m/s^2$ may be appropriate. Other suitable thresholds can be chosen for other applications with a small amount of experimentation.

If the acceleration value (in either case) is greater than the maximum acceleration threshold, then the processor 120 determines that the corresponding incremental distance estimate is wrong. Odometry can then be based on the other incremental distance estimate (provided it passed all the relevant tests). Alternatively, odometry can be suppressed for the present epoch, and tried again at a subsequent epoch.

In this way, the combining of the incremental distance estimates can be suppressed, by the distance update check 250, when either one of the incremental distance estimates implies unrealistic (or impossible) values of speed or acceleration. This additional check helps to further filter erroneous data from the odometry solution.

It should be understood that the scope of the present disclosure is not limited to the examples described above. Many variations will be apparent to those skilled in the art, based on the foregoing description.

In the examples described above, the navigation solution was based at least in part on GNSS measurements. However, although this may be advantageous, it is not essential. As already explained above, inertial measurements can be used to estimate the navigation solution periods in which GNSS reception is lost (at least temporarily). The present approach of combining the outputs of a position-based odometer and a velocity-based odometer can be applied also when the navigation solution is based solely on inertial measurements. When applying the checks performed by the quality check engine 230, the GNSS quality factor can be overridden and forced equal to 1, when the navigation solution is based on inertial measurements alone. Effectively, this reduces the number of tests performed by the quality check engine from three to two.

In the examples described above, the GNSS receiver module 100 incorporated the components of a GNSS receiver (such as RF front-end 105 and signal processing unit 110). It also included the IMU 112. In other examples a GNSS receiver and IMU may be provided separately from one another. A GNSS receiver may be provided as part of a GNSS receiver module, and an IMU may be provided separately from the GNSS receiver module. Inertial measurements from an external IMU may be input to a GNSS receiver module via a physical connection, such as an 12C interface. Alternatively, they may be input via a software interface, such as a universal asynchronous receiver-transmitter (UART) interface.

In general, in the flowcharts of FIGS. 2-3, the arrows between the steps do not necessarily imply a causal relationship between those steps. They merely indicate one exemplary order in which the steps may be performed. Method steps may be carried out in a different order from the exemplary order shown in the drawings.

It should be understood that various components illustrated in FIGS. 1-2 may be implemented in hardware, or software, or a mixture of both. Furthermore, some components may be grouped together in a given implementation or may be implemented separately. In the present implementation, the RF front-end 105 and the IMU 112 are implemented entirely in hardware, signal processing unit 110 is implemented partially in hardware, and the remaining components (downstream in the signal processing chain) are implemented in software. Other implementations are possible, which divide and distribute the various functions differently between hardware and software, or between different hardware components, software modules and/or processors running the software.

In the claims, any reference signs placed between parentheses shall not be construed as limiting the claim. The word "comprising" does not exclude the presence of elements or steps other than those listed in a claim. However, where the word "comprising" is used, this also discloses as a special case the possibility that the elements or steps listed are exhaustive—that is, the apparatus or method may consist solely of those elements or steps. The word "a" or "an" preceding an element does not exclude the presence of a plurality of such elements. The embodiments may be implemented by means of hardware comprising several distinct elements. In a device claim enumerating several means, several of these means may be embodied by one and the same item of hardware. The mere fact that certain measures are recited in mutually different dependent claims does not indicate that a combination of these measures cannot be used to advantage. Furthermore, in the appended claims lists comprising "at least one of: A; B; and C" should be interpreted as (A and/or B) and/or C.

In flowcharts, summaries, claims, and descriptions relating to methods, the sequence in which steps are listed is not, in general, intended to be limiting on the order in which they are carried out. The steps may be performed in a different order to that indicated (except where specifically indicated, or where a subsequent step relies on the product of a preceding step). Nevertheless, the order in which the steps are described may in some cases reflect a preferred sequence of operations.

Furthermore, in general, the various embodiments may be implemented in hardware or special purpose circuits, software, logic or any combination thereof. For example, some aspects may be implemented in hardware, while other aspects may be implemented in firmware or software, which may be executed by a controller, microprocessor or other computing device, although these are not limiting examples. While various aspects described herein may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments described herein may be implemented by computer software executable by a data processor of the apparatus, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, or CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments as discussed herein may be practiced in various components such as integrated circuit modules. The design of integrated circuits is generally a highly automated process. Complex and powerful software tools are available for converting a logic level design into a semiconductor circuit design ready to be etched and formed on a semiconductor substrate.

The invention claimed is:

1. A method for odometry, comprising:
obtaining a previous position estimate for a device;
obtaining a current position estimate for the device;
obtaining a current velocity estimate for the device;
calculating a first distance estimate for a distance travelled by the device, based on the previous position estimate and the current position estimate;
calculating a second distance estimate for the distance travelled by the device, based on the current velocity estimate;
combining the first distance estimate and the second distance estimate, to generate a combined distance estimate for the distance travelled by the device;
obtaining a variance for the previous position estimate;
obtaining a variance for the current position estimate;
obtaining a variance for the current velocity estimate;
calculating a first variance for the first distance estimate, based on the variance for the current position estimate and the variance for the previous position estimate; and
calculating a second variance for the second distance estimate, based on the variance for the current velocity estimate,
wherein combining the first distance estimate and the second distance estimate comprises weighting the first distance estimate in inverse relation to the first variance and weighting the second distance estimate in inverse relation to the second variance.

2. The method of claim 1, wherein combining the first distance estimate and the second distance estimate comprises a weighted sum.

3. The method of claim 1, further comprising calculating a variance for the combined distance estimate based on the first variance and the second variance.

4. The method of claim 1 further comprising, for at least one of the first distance estimate and the second distance estimate:
calculating a speed from the distance estimate; and
comparing the speed with a maximum speed threshold,
wherein combining the first distance estimate and the second distance estimate is performed responsive at least in part to the speed not exceeding the maximum speed threshold.

5. The method of claim 1 further comprising, for at least one of the first distance estimate and the second distance estimate:
calculating an acceleration based on the distance estimate; and
comparing the acceleration with a maximum acceleration threshold,
wherein combining the first distance estimate and the second distance estimate is performed responsive at least in part to the acceleration not exceeding the maximum acceleration threshold.

6. The method of claim 1 wherein any one or any combination of two or more of the following are provided by a navigation filter:

the previous position estimate;
the current position estimate;
the current velocity estimate;
the variance for the current position estimate; and
the variance for the current velocity estimate.

7. The method of claim 1, wherein the device comprises an inertial measurement unit and wherein any one or any combination of two or more of the following are based at least in part on inertial measurements provided by the inertial measurement unit:
the previous position estimate;
the current position estimate;
the current velocity estimate;
the variance for the current position estimate; and
the variance for the current velocity estimate.

8. The method of claim 1, wherein any one or any combination of two or more of the following are based at least in part on global navigation satellite system (GNSS) measurements derived from GNSS signals:
the previous position estimate;
the current position estimate;
the current velocity estimate;
the variance for the current position estimate; and
the variance for the current velocity estimate.

9. The method of claim 8, further comprising:
calculating a quality factor associated with the GNSS measurements; and
comparing the quality factor to a quality threshold,
wherein combining the first distance estimate and the second distance estimate is performed responsive at least in part to the quality factor exceeding the quality threshold.

10. The method of claim 9, wherein the quality factor is based at least in part on a number of satellites associated with the GNSS signals.

11. The method of claim 1 further comprising comparing a magnitude of the current velocity estimate with a minimum speed threshold,
wherein combining the first distance estimate and the second distance estimate is performed responsive at least in part to the magnitude of the current velocity estimate exceeding the minimum speed threshold.

12. The method of claim 1 further comprising:
obtaining an uncertainty estimate associated with the current position estimate; and
comparing the uncertainty estimate with an uncertainty threshold,
wherein combining the first distance estimate and the second distance estimate is performed responsive at least in part to the uncertainty estimate being less than the uncertainty threshold.

13. One or more tangible, non-transitory, computer-readable media storing instructions that, when executed by one or more processors, cause the one or more processors to perform operations comprising:
obtaining a previous position estimate for a device;
obtaining a current position estimate for the device;
obtaining a current velocity estimate for the device;
calculating a first distance estimate for a distance travelled by the device, based on the previous position estimate and the current position estimate;
calculating a second distance estimate for the distance travelled by the device, based on the current velocity estimate;
combining the first distance estimate and the second distance estimate, to generate a combined distance estimate for the distance travelled by the device;

obtaining a variance for the previous position estimate;
obtaining a variance for the current position estimate;
obtaining a variance for the current velocity estimate;
calculating a first variance for the first distance estimate, based on the variance for the current position estimate and the variance for the previous position estimate; and
calculating a second variance for the second distance estimate, based on the variance for the current velocity estimate,
wherein combining the first distance estimate and the second distance estimate comprises weighting the first distance estimate in inverse relation to the first variance and weighting the second distance estimate in inverse relation to the second variance.

14. A device for odometry, comprising:
a memory for storing estimates of a distance travelled by the device; and
at least one processor, configured to:
obtain a previous position estimate for the device;
obtain a current position estimate for the device;
obtain a current velocity estimate for the device;
calculate a first distance estimate for the distance travelled by the device, based on the previous position estimate and the current position estimate;
calculate a second distance estimate for the distance travelled by the device, based on the current velocity estimate;
combine the first distance estimate and the second distance estimate, to generate a combined distance estimate for the distance travelled by the device;
obtain a variance for the previous position estimate;
obtain a variance for the current position estimate;
obtain a variance for the current velocity estimate;
calculate a first variance for the first distance estimate, based on the variance for the current position estimate and the variance for the previous position estimate; and
calculate a second variance for the second distance estimate, based on the variance for the current velocity estimate,
wherein combining the first distance estimate and the second distance estimate comprises weighting the first distance estimate in inverse relation to the first variance and weighting the second distance estimate in inverse relation to the second variance.

15. The device of claim 14, wherein the at least one processor is configured to combine the first distance estimate and the second distance estimate using a weighted sum.

16. The device of claim 14, wherein the at least one processor is configured to calculate a variance for the combined distance estimate based on the first variance and the second variance.

17. The device of claim 14, wherein the at least one processor is configured to, for at least one of the first distance estimate and the second distance estimate:
calculate a speed from the distance estimate; and
compare the speed with a maximum speed threshold,
wherein combining the first distance estimate and the second distance estimate is performed responsive at least in part to the speed not exceeding the maximum speed threshold.

18. The device of claim 14, wherein the at least one processor is configured to, for at least one of the first distance estimate and the second distance estimate:
calculate an acceleration based on the distance estimate; and
compare the acceleration with a maximum acceleration threshold, wherein combining the first distance estimate and the second distance estimate is performed responsive at least in part to the acceleration not exceeding the maximum acceleration threshold.

\* \* \* \* \*